United States Patent
Kim et al.

(10) Patent No.: US 9,862,870 B2
(45) Date of Patent: Jan. 9, 2018

(54) THERMALLY-CONDUCTIVE POLYCARBONATE RESIN COMPOSITION AND MOLDED PRODUCT FORMED THEREFROM

(71) Applicant: SAMSUNG SDI CO., LTD., Yongin-si (KR)

(72) Inventors: Nam Hyun Kim, Uiwang-si (KR); Chan Gyun Shin, Uiwang-si (KR); Byung Kuk Jeon, Uiwang-si (KR); Jong Cheol Lim, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/912,963

(22) PCT Filed: Dec. 2, 2013

(86) PCT No.: PCT/KR2013/011065
§ 371 (c)(1),
(2) Date: Feb. 19, 2016

(87) PCT Pub. No.: WO2015/026014
PCT Pub. Date: Feb. 26, 2015

(65) Prior Publication Data
US 2016/0200957 A1    Jul. 14, 2016

(30) Foreign Application Priority Data

Aug. 23, 2013 (KR) .......................... 10-2013-0100100

(51) Int. Cl.
*C09K 5/14* (2006.01)
*C08L 69/00* (2006.01)
*C08L 23/26* (2006.01)

(52) U.S. Cl.
CPC .............. *C09K 5/14* (2013.01); *C08L 23/26* (2013.01); *C08L 69/00* (2013.01); *C08K 2201/001* (2013.01)

(58) Field of Classification Search
CPC ..... C09K 5/14; C09K 2201/001; C08L 69/00; C08L 23/26
See application file for complete search history.

(56) References Cited

U.S. PATENT DOCUMENTS

| | | | | |
|---|---|---|---|---|
| 6,362,269 | B1* | 3/2002 | Ishihata | C08K 7/00 524/449 |
| 8,299,159 | B2 | 10/2012 | Chandrasekhar et al. | |
| 2006/0286295 | A1* | 12/2006 | Kiyokawa | C01F 5/02 427/212 |
| 2012/0010365 | A1* | 1/2012 | Lin | C08F 255/00 525/93 |
| 2013/0240778 | A1* | 9/2013 | Imada | C09K 5/00 252/75 |
| 2014/0080951 | A1* | 3/2014 | Raman | B29C 47/385 524/264 |

FOREIGN PATENT DOCUMENTS

| | | |
|---|---|---|
| CN | 102286207 A | 12/2011 |
| EP | 1095983 A1 | 5/2001 |
| JP | 2011-038078 A | 2/2011 |
| KR | 10-1999-0038454 A | 10/1999 |
| KR | 10-2001-0038924 A | 5/2001 |
| KR | 10-2001-0108642 A | 12/2001 |
| KR | 10-2007-0043347 A | 4/2007 |
| KR | 10-2007-0102245 A | 10/2007 |
| KR | 10-2009-0070101 A | 7/2009 |
| WO | 2015/026014 A1 | 2/2015 |

OTHER PUBLICATIONS

Office Action in counterpart Chinese Application No. 201380079037.1 dated Aug. 30, 2016, pp. 1-6.
International Search Report in counterpart International Application No. PCT/KR2013/011065, dated Jan. 28, 2014, pp. 1-4.

* cited by examiner

*Primary Examiner* — Robert Jones, Jr.
(74) *Attorney, Agent, or Firm* — Additon, Higgins & Pendleton, P.A.

(57) ABSTRACT

The present invention relates to a thermally conductive polycarbonate resin composition comprising (A) a polycarbonate resin, (B) a thermally conductive filler, (C) a modified polyolefin-based copolymer and (D) a low-molecular-weight polyolefin-based resin, thereby simultaneously exhibiting high impact strength, improving thermal conductivity and mechanical properties such as tensile strength and elongation, and having an excellent extrusion molding property.

12 Claims, No Drawings

THERMALLY-CONDUCTIVE POLYCARBONATE RESIN COMPOSITION AND MOLDED PRODUCT FORMED THEREFROM

CROSS-REFERENCE TO RELATED APPLICATIONS

This application claims priority to and the benefit of International Application No. PCT/KR2013/011065, filed Dec. 2, 2013, which published as WO 2015/026014 on Feb. 26, 2015, and Korean Patent Application No. 10-2013-0100100, filed in the Korean Intellectual Property Office on Aug. 23, 2013, the entire disclosure of each of which is incorporated herein by reference.

TECHNICAL FIELD

The present invention relates to a thermally conductive polycarbonate resin composition that exhibits excellent flowability, thermal conductivity, and impact resistance, and mechanical properties, and a molded article formed from the same.

BACKGROUND ART

Metals having high thermal conductivity have been widely used as a material for a main body of an electronic device including heat-generating components, chasses, heat sinks, and the like. Metal allows heat to spread quickly to the surrounding environment, thereby protecting electronic components vulnerable to heat from local high temperature. In addition, metals have excellent mechanical strength and processability and are suitable for a heat dissipating material having a complex shape. However, metals have disadvantages of high cost and increase in weight. Accordingly, thermally conductive resins are replacing metals.

As electronic devices are reduced in size and improved in performance, components mounted in the devices are required to be highly integrated. However, such devices frequently suffer from malfunction due to thermal load out of proportion to power output. In addition, it is difficult to quickly dissipate heat due to reduction in thickness and weight of the devices. Typical thermally conductive resins have limitations in solving these problems due to low thermal conductivity.

Conventional thermally conductive resins exhibiting heat dissipating properties have been developed by focusing on selection of fillers having high thermal conductivity. As thermally conductive fillers used to provide thermal conductivity, carbon-based fillers such as graphite and ceramic-based fillers such as aluminum oxide, magnesium oxide, and aluminum nitride are mainly used. It has been proposed to use a proper combination of such fillers, fillers having thermal conductivity in a specific range, or fillers having a specific particle size.

However, when high weight ratios of fillers having high thermal conductivity are simply added to a resin to improve thermal conductivity, a resin composition has poor melt flowability causing deterioration in productivity in manufacture of molded articles. In addition, when an injection molding speed is increased in order to improve productivity of such a resin composition, small products suffer from deterioration in injection moldability and large products are likely to suffer from short shot or deterioration in aesthetics. Further, since molded articles manufactured in this way have poor mechanical properties such as strength due to an excess of thermally conductive fillers, the amount of fillers needs to be limited, thereby making it difficult to sufficiently improve thermal conductivity.

Thus, in order to maximize thermal conductivity while minimizing the amounts of such fillers, it is important to allow a network of fillers to be efficiently formed in a thermally conductive resin. In addition, in order to prevent deterioration in injection moldability even when a large amount of fillers are added, it is important to use a resin having low viscosity. However, since such a resin having low viscosity has low molecular weight and high reactivity between molecular chains, thereby easily causing reaction during extrusion and injection molding, unwanted side effects such as curing reaction can occur.

Japanese Patent Publication No. 2011-038078 (Patent document 1) discloses a thermally conductive resin composition containing a high density polyethylene polymer matrix including fillers, and Korean Patent No. 227,123 (Patent document 2) discloses a polycarbonate resin composition which has good chemical resistance and flowability and exhibits excellent stiffness and impact strength. However, in such resin compositions, specific reinforcing agents are used to prevent reduction in impact strength due to thermally conductive fillers, thus there are problems of deterioration in thermal conductivity and moldability.

Therefore, there is a need for a highly thermally conductive resin which can secure flowability to efficiently form a network of fillers, thereby exhibiting improved mechanical properties such as impact strength and tensile strength and thermal conductivity while securing excellent injection moldability.

DISCLOSURE

Technical Problem

It is an aspect of the present invention to provide a thermally conductive polycarbonate resin composition capable of improving mechanical properties such as impact strength and tensile strength and thermal conductivity while exhibiting excellent injection moldability, and a molded article formed from the same.

Technical Solution

In accordance with one aspect of the present invention, a thermally conductive polycarbonate resin composition includes: (A) a polycarbonate resin, (B) thermally conductive fillers, (C) a modified polyolefin copolymer, and (D) a low molecular weight polyolefin resin.

In one embodiment, the thermally conductive polycarbonate resin composition may include 0.1 parts by weight to 5 parts by weight of the modified polyolefin copolymer (C) and 0.1 parts by weight to 5 parts by weight of the low molecular weight polyolefin resin (D) based on 100 parts by weight of a base resin including 20 wt % to 80 wt % of the polycarbonate resin (A) and 20 wt % to 80 wt % of the thermally conductive fillers (B).

In one embodiment, the modified polyolefin copolymer may contain at least one functional group selected from among a maleic anhydride group, an amine group, and an epoxy group.

In one embodiment, the low molecular weight polyolefin resin may have a weight average molecular weight of 1,000 g/mol to 10,000 g/mol.

In one embodiment, the low molecular weight polyolefin resin may be prepared by pyrolysis or chemolysis of a high molecular weight polyolefin.

In one embodiment, the thermally conductive fillers (B) may be selected from the group consisting of magnesium oxide, boron nitride, aluminum oxide, and mixtures thereof.

In one embodiment, the thermally conductive polycarbonate resin composition may further include additives selected from the group consisting of antimicrobials, heat stabilizers, antioxidants, release agents, photo-stabilizers, inorganic additives, surfactants, coupling agents, plasticizers, compatibilizers, lubricants, antistatic agents, colorants, pigments, dyes, flame retardants, auxiliary flame retardants, anti-dripping agents, weathering agents, UV absorbers, UV blocking agents, and mixtures thereof.

In accordance with another aspect of the present invention, a molded article is manufactured from the thermally conductive polycarbonate resin composition as set forth above.

Advantageous Effects

According to the present invention, it is possible to provide a thermally conductive polycarbonate resin composition that has improved flowability and allows efficient formation of a network of fillers despite including a large amount of the fillers, thereby exhibiting excellent thermal conductivity and injection moldability.

In addition, according to the present invention, it is possible to provide a thermally conductive polycarbonate resin composition that has excellent mechanical properties such as tensile strength, tensile elongation, flexural strength, and flexural modulus while exhibiting high impact strength.

BEST MODE

Hereinafter, embodiments of the present invention will be described in detail. The following embodiments are provided for complete disclosure and to provide thorough understanding of the present invention to those skilled in the art. Unless otherwise defined herein, all terms including technical or scientific terms used herein have the same meanings as commonly understood by those skilled in the art to which the present invention pertains. Descriptions of known functions and constructions which can unnecessarily obscure the subject matter of the present invention will be omitted.

As used herein, the term "low molecular weight polyolefin resin" refers to a polyolefin resin having a weight average molecular weight of 10,000 g/mol or less. In addition, as used herein, the term "high molecular weight polyolefin resin" is a relative concept of the low molecular weight polyolefin resin and refers to a polyolefin resin having a weight average molecular weight of greater than 10,000 g/mol.

A thermally conductive polycarbonate resin composition according to the present invention may include (A) a polycarbonate resin, (B) thermally conductive fillers, (C) a modified polyolefin copolymer, and (D) a low molecular weight polyolefin resin.

Hereinafter, each of the above components will be described in more detail.

(A) Polycarbonate Resin

The polycarbonate resin may be used to provide mechanical properties such as stiffness and impact strength and excellent thermal conductivity, moldability, and heat resistance. The polycarbonate resin may be a polycarbonate resin prepared by a typical method and is preferably an aromatic polycarbonate resin. By way of example, the polycarbonate resin may be an aliphatic polycarbonate resin, an aromatic polycarbonate resin, a copolycarbonate resin thereof, a copolyestercarbonate resin, a polycarbonate-polysiloxane copolymer resin, or a mixture thereof. In addition, the polycarbonate resin may have a linear or branched structure.

The polycarbonate resin may be prepared by reacting (a1) an aromatic dihydroxy compound with (a2) a carbonate precursor.

(a1) Aromatic Dihydroxy Compound

The aromatic dihydroxy compound (a1) is a compound represented by Formula 1 or a mixture thereof:

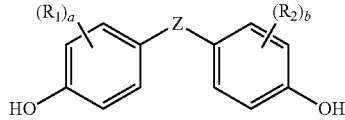

[Formula 1]

wherein, $R_1$ and $R_2$ are each independently hydrogen, halogen, or a $C_1$ to $C_8$ alkyl group; a and b are each independently an integer from 0 to 4; and Z is a single bond, a $C_1$ to $C_8$ alkylene group, a $C_2$ to $C_8$ alkylidene group, a $C_5$ to $C_15$ cycloalkylene group, a $C_5$ to $C_{18}$ cycloalkylidene group, —S—, —SO—, $SO_2$—, —O—, or —CO—.

Examples of the aromatic dihydroxy compound (a1) represented by Formula 1 may include bis(hydroxyaryl)alkane, bis(hydroxyaryl)cycloalkane, bis(hydroxyaryl)ether, bis(hydroxyaryl)sulfide, bis(hydroxyaryl)sulfoxide, and a biphenyl compound. These compounds may be used alone or as a mixture thereof.

Specifically, examples of the bis(hydroxyaryl)alkane may include bis(4-hydroxyphenyl)methane, bis(3-methyl-4-hydroxyphenyl)methane, bis(3-chloro-4-hydroxyphenyl)methane, bis(3,5-dibromo-4-hydroxyphenyl)methane, 1,1-bis(4-hydroxyphenyl)ethane, 1,1-bis(2-tert-butyl-4-hydroxy-3-methylphenyl)ethane, 2,2-bis(4-hydroxyphenyl)propane (bisphenol A), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-tert-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl) phenyl methane, 2,2-bis(4-hydroxy-1-methylpheny)propane, 1,1-bis(4-hydroxy-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl)propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-amyl-4-hydroxy-5-methylphenyl)butane, 2,2-bis(3,5-dichloro-4-hydroxyphenyl)butane, 2,2-bis(3,5-dibromo-4- hydrophenyl)butane, 4,4-bis(4-hydroxyphenyl)heptane, 1,1-bis(2-tert-butyl-4-hydroxy-5-methylphenyl)heptane, 2,2-bis(4-hydroxyphenyl)octane, and 1,1-(4-hydroxyphenyl)ethane, without being limited thereto.

Specifically, examples of the bis(hydroxyaryl)cycloalkane may include 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexylhexyl-4-hydroxyphenyl)cyclohexane, 1,1-bis(3-phenyl-4-hydroxyphenyl)cyclohexane, and 1,1-bis(4-hydroxyphenyl)-3,5,5-trimethylcyclohexane, without being limited thereto.

Specifically, examples of the bis(hydroxyaryl)ether may include bis(4-hydroxyphenyl)ether and bis(4-hydroxy-3-methylphenyl)ether, without being limited thereto.

Specifically, examples of the bis(hydroxyaryl)sulfide may include bis(4-hydroxyphenyl)sulfide and bis(3-methyl-4-hydroxyphenyl)sulfide, without being limited thereto.

Specifically, examples of the bis(hydroxyaryl)sulfoxide may include bis(hydroxyphenyl)sulfoxide, bis(3-methyl-4-hydroxyphenyl)sulfoxide and bis(3-phenyl-4-hydroxyphenyl)sulfoxide, without being limited thereto.

Specifically, examples of the biphenyl compound may include bis(hydroxyaryl)sulfone such as bis(4-hydroxyphenyl)sulfone, bis(3-methyl-4-hydroxyphenyl)sulfone, and bis(3-phenyl-4-hydroxyphenyl)sulfone, 4,4'-dihydroxybiphenyl, 4,4'-dihydroxy-2,2'-dimethylbiphenyl, 4,4'-dihydroxy-3,3'-dimethylbiphenyl, 4,4'-dihydroxy-3,3'-dicyclobiphenyl, and 3,3-difluoro-4,4'-dihydroxybiphenyl, without being limited thereto.

The aromatic dihydroxy compound (a1) other than the compound represented by Formula 1 may include dihydroxybenzene, halogen or alkyl-substituted dihydroxybenzene, and the like. Examples of such an aromatic dihydroxy compound may include resorcinol, 3-methylresorcinol, 3-ethylresorcinol, 3-propylresorcinol, 3-butylresorcinol, 3-tert-butylresorcinol, 3-phenylresorcinol, 2,3,4,6-tetrafluororesorcinol, 2,3,4,6-tetrabromoresorcinol, catechol, hydroquinone, 3-methylhydroquinonequinone, 3-ethylhydroquinone, 3-propylhydroquinone, 3-butylhydroquinone, 3-tert-butylhydroquinone, 3-phenylhydroquinone, 3-cumylhydroquinone, 2,5-dichlorohydroquinone, 2,3,5,6-tetramethylhydroquinone, 2,3,5,6-tetra-tert-butylhydroquinone, 2,3,5,6-tetrafluorohydroquinone, and 2,3,5,6-tetrabromohydroquinone, without being limited thereto.

Preferably, the aromatic dihydroxy compound (a1) may be 2,2-bis(4-hydroxyphenyl)propane (bisphenol A).

(a2) Carbonate Precursor

Examples of the carbonate precursor may include dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, bis(diphenyl) carbonate, carbonyl chloride (phosgene), triphosgene, diphosgene, carbonyl bromide, bishaloformate, and the like. These compounds may be used alone or as a mixture thereof.

The carbonate precursor (a2) may be present in an amount of 0.9 mol to 1.5 mol per 1 mol of the aromatic dihydroxy compound (a1).

The polycarbonate resin (A) may have a weight average molecular weight of 10,000 g/mol to 200,000 g/mol, preferably 15,000 g/mol to 80,000 g/mol.

The thermally conductive polycarbonate resin composition according to the present invention includes the polycarbonate resin (A) and the thermally conductive fillers (B) as a base resin, wherein the polycarbonate resin (A) may be present in an amount of 20 wt % to 80 wt % in the base resin. In this case, the polycarbonate resin composition can exhibit excellent properties in terms of thermal conductivity, impact resistance, and moldability.

(B) Thermally Conductive Fillers

Although the thermally conductive fillers may include any filler capable of improving thermal conductivity, it is desirable in terms of flowability that the thermally conductive fillers include spherical fillers. Spherical fillers have electrical insulating properties while exhibiting excellent thermal conductivity not only in a horizontal (in-plane) direction but also in a vertical direction (z-direction). In other words, spherical fillers have an advantage of exhibiting excellent thermal conductivity regardless of directivity.

In addition, spherical thermally conductive fillers are superior to plate-type particles or flakes in terms of flowability. Further, to secure flowability, it is desirable to use fillers composed of particles having relatively large average particle diameter. Here, it is necessary to select the range of particle diameter in view of balance with other properties.

Preferably, the thermally conductive fillers has an average particle diameter of 30 μm to 80 μm, more preferably 40 μm to 60 μm. Preferably, thermally conductive fillers having an average particle diameter in the above range are present in an amount of 80 wt % or more based on the total weight of the thermally conductive fillers. In addition, the spherical particles have a specific surface area (BET) of 0.4 $m^2/g$ to 0.6 $m^2/g$. If the average particle diameter is less than 30 μm and BET is less than 0.4 $m^2/g$, the resin composition can exhibit poor flowability, whereas if the average particle diameter is greater than 80 μm and BET is greater than 0.6 $m^2/g$, the resin composition can exhibit poor thermal conductivity.

The thermally conductive fillers may include magnesium oxide, boron nitride, aluminum oxide, aluminum nitride, and a mixture thereof. Thereamong, magnesium oxide having good thermal conductivity is preferably used. The thermally conductive fillers (B) may be present in an amount of 20 wt % to 80 wt % in the base resin. If the amount of the thermally conductive fillers is less than 20 wt %, the polycarbonate resin composition can exhibit poor thermal conductivity, whereas if the amount of the thermally conductive fillers exceeds 80 wt %, the polycarbonate resin composition can exhibit poor properties in terms of impact strength, tensile strength, and flexural strength since the thermally conductive fillers act as impurities causing deterioration in adhesion between interfaces.

(C) Modified Polyolefin Copolymer

In the present invention, the modified polyolefin copolymer may be used to improve impact resistance and moldability of the polycarbonate resin composition. The modified polyolefin copolymer may be a branched graft copolymer having a polyolefin backbone with a compound containing a functional group grafted thereto.

The modified polyolefin copolymer may be prepared by grafting at least one of a maleic anhydride group, an amine group, an epoxy group, and a mixture thereof to the polyolefin backbone.

The backbone of the modified polyolefin copolymer may be at least one selected from the group consisting of polyethylene, polypropylene, and an ethylene-propylene copolymer.

The compound containing a functional group may be present in an amount of 0.2 wt % to 5 wt %, preferably 1.0 wt % to 2.0 wt %, more preferably 1.0 wt % to 1.5 wt %, based on the total weight of the modified polyolefin copolymer. If the amount of the compound containing a functional group is less than 0.2 wt %, the resin composition cannot exhibit impact resistance, whereas if the amount of the compound containing a functional group exceeds 5 wt %, the resin composition can exhibit poor impact resistance.

The modified polyolefin copolymer (C) may be present in an amount of 0.1 parts by weight to 5 parts by weight based on 100 parts by weight of the base resin including the polycarbonate resin (A) and the thermally conductive fillers (B). If the amount of the modified polyolefin copolymer is less than 0.1 parts by weight, improvement of desired properties is insignificant, whereas if the amount of the modified polyolefin copolymer exceeds 5 parts by weight, the polycarbonate resin composition has improved impact strength, but can suffer deterioration in other properties such as flowability, moldability, and heat resistance.

As the amount of the modified polyolefin copolymer is increased within the above range, the composition can exhibit improved mechanical properties such as impact strength, tensile elongation, and tensile strength. Improvement in tensile elongation results in increase in flexural energy and thus can improve falling dart impact of an injection molded product while improving mold release properties and continuous workability even when an excess of fillers is added.

In addition, increase in the amount of the modified polyolefin copolymer within the above range can cause increase in viscosity of the polycarbonate resin composition and is thus effective in improvement of processability in a special process such as extrusion and improving appearance.

(D) Low Molecular Weight Polyolefin Resin

The low molecular weight polyolefin resin can improve dispersibility of components in the resin composition and improve resin flowability, thereby allowing efficient formation of a network of fillers even when the resin composition includes a large amount of the fillers.

The low molecular weight polyolefin resin may be formed from at least one selected from olefin monomers such as ethylene, propylene, isopropylene, butylene, and isobutylene, or may be prepared by pyrolysis or chemolysis of a high molecular weight polyolefin resin. Examples of the low molecular weight polyolefin may include polyethylene resins, polypropylene resins, ethylene-propylene resins, oxidized ethylene-propylene copolymer resins, and the like. The low molecular weight polyolefin resin may be an aromatic monomer-modified polyolefin resin such as a resin obtained by copolymerization of the above polyolefin resins with polystyrene, poly(α-methylstyrene), or poly(t-butyl styrene). The polyethylene may be low density, medium density, or high density polyethylene, preferably high density polyethylene.

Here, the low molecular weight polyolefin resin may have a weight average molecular weight of 1,000 g/mol to 10,000 g/mol, preferably 2,000 g/mol to 5,000 g/mol. If the weight average molecular weight of the low molecular weight polyolefin resin is less than 1,000 g/mol, the resin composition can be decomposed during molding due to low viscosity and poor thermal properties, whereas if the weight average molecular weight of the low molecular weight polyolefin resin is greater than 10,000 g/mol, the resin composition can exhibit poor properties in terms of thermal conductivity, impact resistance, tensile strength, and tensile elongation.

Preferably, the low molecular weight polyolefin resin is present in an amount of 0.1 parts by weight to 5 parts by weight based on 100 parts by weight of the base resin including the polycarbonate resin (A) and the thermally conductive fillers (B). If the amount of the low molecular weight polyolefin resin is out of this range, the low molecular weight polyolefin resin cannot sufficiently increase flowability of the resin composition, and thus has difficulty in improving mechanical properties such as impact resistance, tensile strength, and tensile elongation though combination of other components.

(E) Additives

The thermally conductive polycarbonate resin composition may further include additives selected from the group consisting of antimicrobials, heat stabilizers, antioxidants, release agents, photo-stabilizers, inorganic additives, surfactants, coupling agents, plasticizers, compatibilizers, lubricants, antistatic agents, colorants, pigments, dyes, flame retardants, auxiliary flame retardants, anti-dripping agents, weathering agents, UV absorbers, UV blocking agents, and mixtures thereof.

Examples of the antioxidants may include phenol, phosphite, thioether, and amine antioxidants, without being limited thereto.

Examples of release agents may include a fluorine-containing polymer, silicone oil, a metal salt of stearic acid, a metal salt of montanic acid, a montanic acid ester resin, and polyethylene resin, without being limited thereto.

Examples of the inorganic additives may include glass fibers, carbon fibers, silica, mica, alumina, calcium carbonate, calcium sulfate, and glass beads, without being limited thereto.

Examples of the pigments or dyes may include titanium dioxide, carbon black, and the like. Examples of the carbon black may include graphitized carbon, furnace black, acetylene black, and ketjen black, without being limited thereto.

Examples of the flame retardants may include phosphorous, nitrogen, and halogen flame retardants, and examples of the auxiliary flame retardants may include antimony oxide, without being limited thereto.

Examples of anti-dripping agents may include polytetrafluoroethylene, without being limited thereto.

Examples of the weathering agents may include benzophenone or amine weathering agents, without being limited thereto.

The additives (D) may be present in an amount of 0.1 parts by weight to 5 parts by weight based on 100 parts by weight of the base resin including the polycarbonate resin (A) and the thermally conductive fillers (B).

The thermally conductive polycarbonate resin composition according to the present invention may be prepared by a typical method known in the art. For example, the polycarbonate resin composition may be prepared in pellet form by mixing the above components and optionally other additives, followed by melt-extrusion using an extruder.

The thermally conductive polycarbonate resin composition is preferably used for a molded article requiring excellent thermal conductivity, impact resistance, and moldability. For example, the thermally conductive polycarbonate resin composition is preferably used as a material for a light emitting device of various electric/electronic components, indoor luminaires, automotive luminaires, displays, headlamps, and the like. More preferably, the thermally conductive polycarbonate resin composition is used for LED tubes or the like.

Here, a molded article manufactured using the thermally conductive polycarbonate resin composition may have an impact strength (kgf·cm/cm) of 6 to 15 and a melt flow index of 20 to 35.

The thermally conductive polycarbonate resin composition may be manufactured into a molded article by any typical method without limitation. For example, extrusion, injection molding, and casting, and the like may be employed. Such molding methods are well known to those skilled in the art.

Next, the present invention will be described in more detail with reference to some examples. It should be understood that these examples are provided for illustration only and are not to be construed in any way as limiting the present invention.

Details of components used in the following Examples and Comparative Examples are as follows:

(A) Polycarbonate Resin

Polycarbonate INFINO SC-1190 available from Cheil Industries Inc. (MI (D-1238, 250° C./10 kg, g/10 min): 29.5, Mw: 22,000 g/mol, Mn: 11,000 g/mol) was used.

(B) Thermally Conductive Fillers

Magnesium oxide available from UBE Chemicals (RF-50-SC, average particle diameter: 53 μm) was used.

(C) Modified Polyolefin Copolymer (MAH-HDPE)

Maleic anhydride-grafted high density polyethylene (MI (D-1238, 190° C./2.16 kg, g/10 min: 4.5) was used.

(D) Low Molecular Weight Polyolefin Resin (Low Molecular Weight HDPE Resin)

Polyethylene prepared by pyrolysis of high density polyethylene and having a weight average molecular weight of 4,000 g/mol was used.

(D') High Molecular Weight Polyolefin Resin

Polyethylene prepared by pyrolysis of high density polyethylene and having a weight average molecular weight of 50,000 g/mol was used.

EXAMPLE 1

The components were dry mixed in amounts as listed in Table 1. In Table 1, the amounts of (A) and (B) are represented in wt % with respect to 100 wt % of the base resin including (A) and (B), and the amounts of the other components are represented in parts by weight with respect to 100 parts by weight of the base resin.

In Example 1, 1 part by weight of the MAH-HDPE (C) and 0.3 parts by weight of the low molecular weight HDPE resin (D) were dry mixed with 100 parts by weight of the base resin including 40 wt % of the polycarbonate resin (A) and 60 wt % of the thermally conductive fillers (B). The mixture was subjected to extrusion using a twin screw extruder (L/D=40, Φ=45 mm) at 280° C. at a screw rotation speed of 250 rpm at a self-feeding rate of 25 rpm, thereby preparing pellets. The prepared pellets were dried in a dehumidifying dryer at 100° C. for 4 hours, followed by injection molding using a 10 oz. injection machine at 300° C., thereby preparing a specimen for property evaluation. The prepared specimen was evaluated as to the following properties. Results are shown in Table 2.

EXAMPLE 2

A specimen was prepared in the same manner as in Example 1 except that the low molecular weight HDPE resin (D) was used in an amount of 0.5 parts by weight.

EXAMPLE 3

A specimen was prepared in the same manner as in Example 1 except that the low molecular weight HDPE resin (D) was used in an amount of 1 part by weight.

COMPARATIVE EXAMPLE 1

A specimen was prepared in the same manner as in Example 1 except that the low molecular weight HDPE resin (D) was not used.

COMPARATIVE EXAMPLE 2

A specimen was prepared in the same manner as in Comparative Example 1 except that the MAH-HDPE (C) and the low molecular weight HDPE resin (D) were not used.

COMPARATIVE EXAMPLE 3

A specimen was prepared in the same manner as in Example 1 except that the MAH-HDPE (C) was not used and the low molecular weight HDPE resin (D) was used in an amount of 0.3 parts by weight.

COMPARATIVE EXAMPLE 4

A specimen was prepared in the same manner as in Example 1 except that the MAH-HDPE (C) was not used and the low molecular weight HDPE resin (D) was used in an amount of 0.5 parts by weight.

COMPARATIVE EXAMPLE 5

A specimen was prepared in the same manner as in Example 1 except that the MAH-HDPE (C) was not used and the low molecular weight HDPE resin (D) was used in an amount of 1.0 part by weight.

COMPARATIVE EXAMPLE 6

A specimen was prepared in the same manner as in Example 1 except that the HDPE resin (D') having a weight average molecular weight of 50,000 was used instead of the low molecular weight HDPE resin (D).

(Property Evaluation)

1) Thermal Conductivity

Thermal conductivity was measured on a specimen having a size of 1×1×1 mm3 by the laser flash method in accordance with ASTM E 1461.

2) Izod Impact Strength

Izod impact strength was measured on a ⅛" thick notched Izod specimen in accordance with ASTM D256.

3) Melt Index

Melt index of each of the specimens was measured at 250° C./10 kg in accordance with ASTM D1238.

4) Flow Field

Length of flow field of a resin under injection molding conditions was measured. Length of practical flow field was evaluated by maintaining a mold for a 1 mm thick specimen at 80° C., followed by injection molding using a 10 oz injection machine at a force of 95% and measuring length of the specimen.

5) Flexural Modulus and Flexural Strength

Flexural modulus and flexural strength were measured on a ¼" thick specimen at 2.8 mm/min in accordance with ASTM D790.

6) Tensile Strength and Tensile Elongation

Tensile strength and tensile elongation were measured on a ⅛" thick specimen at 5 mm/min in accordance with ASTM D638.

TABLE 1

| | Example | | | Comparative Example | | | | | |
|---|---|---|---|---|---|---|---|---|---|
| | 1 | 2 | 3 | 1 | 2 | 3 | 4 | 5 | 6 |
| (A) Polycarbonate | 40 | 40 | 40 | 40 | 40 | 40 | 40 | 40 | 40 |
| (B) Magnesium oxide | 60 | 60 | 60 | 60 | 60 | 60 | 60 | 60 | 60 |
| (C) MAH-HDPE | 1 | 1 | 1 | 1 | 0 | 0 | 0 | 0 | 1 |
| (D) Low molecular weight HDPE resin | 0.3 | 0.5 | 1 | 0 | 0 | 0.3 | 0.5 | 1 | — |
| (D') High molecular weight HDPE resin | — | — | — | — | — | — | — | — | 1 |

TABLE 2

| | Example | | | Comparative Example | | | | | |
|---|---|---|---|---|---|---|---|---|---|
| | 1 | 2 | 3 | 1 | 2 | 3 | 4 | 5 | 6 |
| Thermal conductivity (W/mK) | 0.98 | 0.98 | 0.97 | 0.98 | 1.01 | 1.00 | 0.98 | 0.97 | 1.01 |
| Impact strength (kgf·cm/cm) | 7.0 | 7.4 | 7.5 | 6.9 | 2.1 | 2.4 | 2.4 | 1.9 | 7.0 |
| Melt index (250° C., 10 kg) | 21 | 26 | 35 | 18 | 61 | 61 | 80 | 91 | 17 |
| Flow field (mm) | 85 | 89 | 96 | 79 | 93 | 97 | 107 | 114 | 81 |
| Flexural strength (kgf/cm$^2$) | 540 | 530 | 520 | 550 | 660 | 670 | 600 | 680 | 530 |
| Flexural modulus (kgf/cm$^2$) | 57,800 | 58,300 | 61,100 | 59,600 | 68,000 | 71,800 | 68,900 | 68,800 | 60,900 |
| Tensile strength (kgf/cm$^2$) | 250 | 250 | 250 | 250 | 460 | 490 | 420 | 510 | 240 |
| Tensile elongation (%) | 5 | 5 | 5 | 5 | 1 | 1 | 1 | 1 | 5 |

As shown in Table 1, it can be seen that the specimens of Examples 1 to 3 exhibited improved mechanical properties such as excellent thermal conductivity, impact strength, flowability, flexural strength and tensile strength as compared with the specimens of Comparative Examples. Particularly, Examples 1 to 3 exhibited relatively high melt index and flow field as compared with the specimen of Comparative Example 1 not including the low molecular weight polyolefin resin according to the present invention, while exhibiting thermal conductivity and mechanical properties at the same or higher level than the specimen of Comparative Example 1.

In addition, it can be seen that the specimens of Examples 1 to 3 exhibited high melt index and flowability as compared with the specimen of Comparative Example 6 prepared using the HDPE resin having a weight average molecular weight of 50,000, while having impact strength, mechanical properties, and thermal conductivity comparable to the specimen of Comparative Example 6.

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention.

Therefore, the scope of the invention should be limited only by the accompanying claims and equivalents thereof.

The invention claimed is:

1. A thermally conductive polycarbonate resin composition, comprising: (A) a polycarbonate resin, (B) thermally conductive fillers, (C) 0.1 parts by weight to 5 parts by weight of a modified polyolefin copolymer, and (D) 0.1 parts by weight to 5 parts by weight of a low molecular weight polyolefin resin having a weight average molecular weight of 1,000 g/mol to 10,000 g/mol, wherein the amounts of (C) modified polyolefin copolymer and (D) low molecular weight polyolefin resin are based on 100 parts by weight of a base resin comprising 20 wt % to 40 wt % of the polycarbonate resin (A) and 60 wt % to 80 wt % of the thermally conductive fillers (B), wherein the thermally conductive fillers (B) are spherical fillers having an average particle diameter of 30 μm to 80 μm.

2. The thermally conductive polycarbonate resin composition according to claim 1, wherein the modified polyolefin copolymer contains at least one functional group selected from among a maleic anhydride group, an amine group, and an epoxy group.

3. The thermally conductive polycarbonate resin composition according to claim 1, wherein the low molecular weight polyolefin resin is prepared by pyrolysis or chemolysis of a high molecular weight polyolefin, wherein the high molecular weight polyolefin has a higher molecular weight than the low molecular weight polyolefin prepared by pyrolysis or chemolysis thereof.

4. The thermally conductive polycarbonate resin composition according to claim 1, wherein the thermally conductive fillers (B) are selected from the group consisting of magnesium oxide, boron nitride, aluminum oxide, and mixtures thereof.

5. The thermally conductive polycarbonate resin composition according to claim 1, further comprising: additives selected from the group consisting of antimicrobials, heat stabilizers, antioxidants, release agents, photo-stabilizers, inorganic additives, surfactants, coupling agents, plasticizers, compatibilizers, lubricants, antistatic agents, colorants, pigments, dyes, flame retardants, auxiliary flame retardants, anti-dripping agents, weathering agents, UV absorbers, UV blocking agents, and mixtures thereof.

6. A molded article comprising the thermally conductive polycarbonate resin composition according to claim 1.

7. The molded article according to claim 6, wherein the molded article has an impact strength (kgf·cm/cm) of 6 to 15 and a melt index (250° C./10 kg, g/10 min) of 20 to 35.

8. The thermally conductive polycarbonate resin composition according to claim 1, wherein the thermally conductive fillers (B) comprise magnesium oxide.

9. The thermally conductive polycarbonate resin composition according to claim 8, wherein the magnesium oxide has an average particle diameter of 40 μm to 60 μm.

10. The thermally conductive polycarbonate resin composition according to claim 1, wherein a molded article made using the thermally conductive polycarbonate resin has an impact strength (kgf·cm/cm) of 6 to 15, a melt index (250° C./10 kg, g/10 min) of 20 to 35, and a thermal conductivity of 0.97 to 0.98 W/mK as measured on a specimen having a size of 1×1×1 mm3 by the laser flash method in accordance with ASTM E 1461.

11. The thermally conductive polycarbonate resin composition according to claim 1, wherein the modified polyolefin copolymer (C) comprises a polyolefin backbone comprising at least one of polyethylene, polypropylene, and an ethylene-propylene copolymer and 0.2 wt % to 5 wt % of least one of a maleic anhydride group, an amine group, and an epoxy group grafted to the polyolefin backbone.

12. The molded article according to claim 7, wherein the molded article has a thermal conductivity of 0.97 to 0.98 W/mK as measured on a specimen having a size of 1×1×1 mm3 by the laser flash method in accordance with ASTM E 1461.

* * * * *

UNITED STATES PATENT AND TRADEMARK OFFICE
CERTIFICATE OF CORRECTION

PATENT NO. : 9,862,870 B2
APPLICATION NO. : 14/912963
DATED : January 9, 2018
INVENTOR(S) : Nam Hyun Kim et al.

Page 1 of 1

It is certified that error appears in the above-identified patent and that said Letters Patent is hereby corrected as shown below:

In the Specification

Column 4, delete Line 27 and insert:
--to $C_{15}$ cycloalkylene group, a $C_5$ to $C_{15}$ cycloalkylidene--

Column 4, delete Line 51 and insert:
--phenyl methane, 2,2-bis(4-hydroxy-1-methylphenyl)pro- --

Signed and Sealed this
Nineteenth Day of June, 2018

Andrei Iancu
*Director of the United States Patent and Trademark Office*